United States Patent [19]

Russell

[11] 4,282,749
[45] Aug. 11, 1981

[54] STRAIN MEASURING SYSTEM
[76] Inventor: John D. Russell, 26878 Sea Vista Dr., Malibu, Calif. 90265
[21] Appl. No.: 116,145
[22] Filed: Jan. 28, 1980
[51] Int. Cl.³ .............................................. G01L 5/00
[52] U.S. Cl. ................................ 73/862.58; 73/862.62
[58] Field of Search ................. 73/141 R, 141 A, 708, 73/760; 137/804

[56] References Cited
U.S. PATENT DOCUMENTS 2,518,906  8/1950  Kocmich ........................ 73/516 LM
2,592,569  4/1952  Henderson ........................ 73/141 R
3,232,104  2/1966  Fishman et al. .................. 73/861.59

Primary Examiner—Donald O. Woodiel
Attorney, Agent, or Firm—Mawhinney & Mawhinney & Connors

[57] ABSTRACT

This invention relates to strain measuring systems. In a preferred embodiment of the invention the system comprises four (4) strain responsive tubes arranged in bridge fashion and carrying a fluid stream under pressure. As strain deforms the tubes the fluid flow is changed proportionate to the strain.

6 Claims, 2 Drawing Figures

STRAIN MEASURING SYSTEM

BACKGROUND OF THE INVENTION

This invention relates to strain measuring systems for measuring strain in a body subjected to variable stress, and, more particularly, to a fluid pressure strain measuring system.

Strain measuring systems have been in use for some time for measuring variable quantities such as strain, pressure, torque, acceleration and temperature. Such systems typically comprise a resistance wire connected in a conventional four-arm bridge circuit which ordinarily is balanced. The force to be measured is coupled mechanically to the resistance wire such that the force exerted on the wire through the coupling means causes the dimensions of the wire to be altered, which results in a proportional change in the resistance of the wire. This change in resistance in turn causes unbalancing of the bridge circuit in an amount proportional to the force applied to the wire. Such resistance wire filament strain measuring systems provide satisfactory results at ambient and moderately high temperatures because either the temperature induced variations of resistance are not significant or temperature compensation is feasible. However, in recent years in the testing and development of devices in the rocketry and missile fields, where temperatures in the thousands of degrees are encountered, the known temperature compensation techniques have not met the demands of these extremely high temperature applications.

Accordingly, it is an object of the present invention to provide a strain measuring system useful at extremely high temperatures.

It is a further object of the present invention to provide a strain measuring system using a fluid pressure strain-responsive bridge circuit to measure strains in extremely high temperature applications.

The present invention is summarized in that a strain measuring system comprises four strain-responsive tubes arranged in bridge circuit fashion and carrying at a constant flow rate and pressure a fluid stream so that a strain caused deformation of the strain-responsive tubes causes a change in fluid flow which is proportional to the strain.

DESCRIPTION OF THE PREFERRED EMBODIMENT

Figure 1:
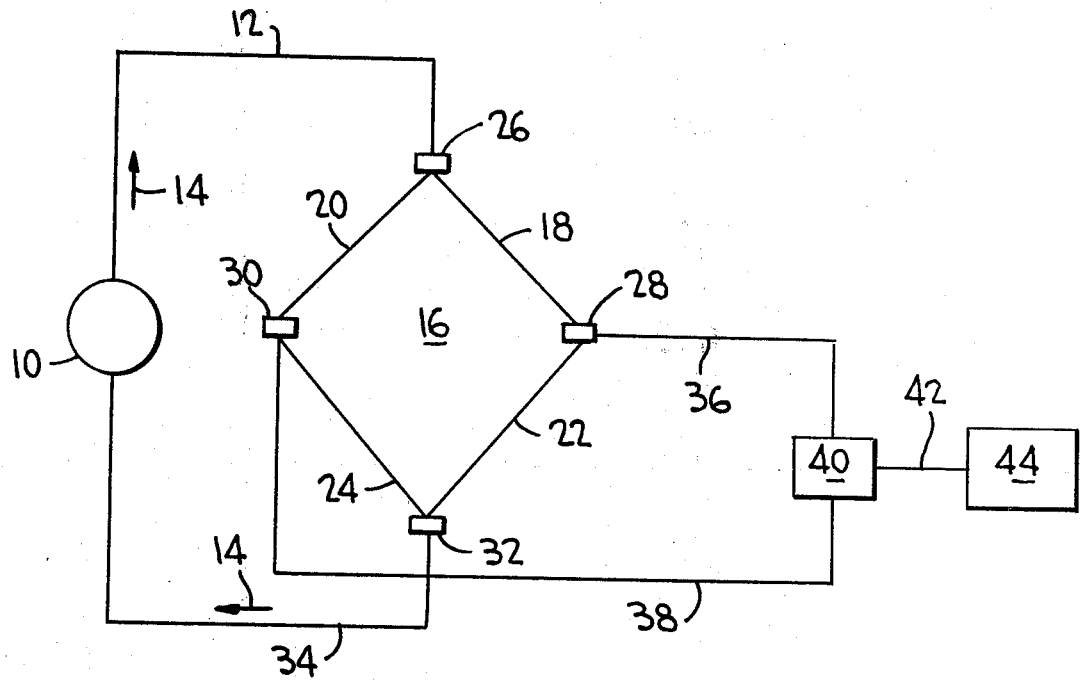
FIG. 1 is a schematic diagram of a fluid pressure strain measuring system of the present invention.

Referring now to the drawings, the present invention is embodied in a fluid pressure strain measuring system illustrated schematically in FIG. 1. A pressure source 10 supplies a fluid stream of air or gas, or liquid (indicated by arrow 14) at a steady rate and pressure to a pressure line 12 which conveys the fluid to a fluid strain bridge indicated generally at 16. The strain bridge comprises four small strain deformable metal tubes 18, 20, 22 and 24 arranged in a manner similar to an electrical Wheatstone bridge. As illustrated, the deformable tubes are connected so that tubes 18 and 20 meet pressure line 12 at an input fluid junction 26 and extend respectively to output fluid junctions 28 and 30. Tube 22 connects fluid junction 28 to an input fluid junction 32 and tube 24 connects fluid junction 30 to fluid junction 32 to complete the four-arm fluid bridge arrangement. A pressure line 34 provides the fluid circuit with a return path from the fluid bridge to the pressure source 10. The fluid bridge is analogous to an electrical Wheatstone bridge circuit in that fluid junctions 26 and 32 comprise the input terminals and fluid junctions 28 and 30 comprise the output terminals. The deformable metal tubes 18, 20, 22 and 24 are of equal diameter but are smaller in diameter than the pressure lines 12 and 34 and have diameters, for example, of approximately 0.001 inch. The strain-deformable metal tubes may, if desired, be designed to have weldable flanges for attachment to a test member.

A pair of output pressure lines 36 and 38 connect output fluid junctions 28 and 30 to a pressure sensitive pickup device or transducer 40, which detects a pressure imbalance and produces an electrical output indicative of the magnitude of the imbalance. An electrical connection 42 connects the output of the pressure sensitive pickup 40 to an indicating device 44.

In the operation of the fluid pressure strain measuring system, the four strain deformable arms are attached to the test member (not shown) by an appropriate manner such as welding. In a steady state of operation and prior to any strain induced deformation of the tubes, a constant rate of fluid exists in each of the equal sized tubes so that there will be no pressure imbalance between fluid junctions 28 and 30 and, accordingly, there will be no output produced by transducer 40. When, however, the test member undergoes a strain and produces a corresponding strain in the tubes, such a strain or deformation of a tube or tubes will change the diameter thereof which in turn changes the rate of fluid flow through the deformed tubes. Such a change in the rate of fluid flow will generate a pressure imbalance between fluid junctions 28 and 30 which will be detected or picked up by transducer 40. The transducer 40 will generate an output which will be indicated by meter 44 as a measure of the strain in the test member. In the analogy of an electrical Wheatstone bridge circuit, a stress deforms the test member and the strain therein causes elongation of the tube(s) and reduces the diameter(s) thereof so that the fluid flow is changed by a measurable amount, much as the flow of current is changed in the conventional electrical bridge circuit.

Figure 2:
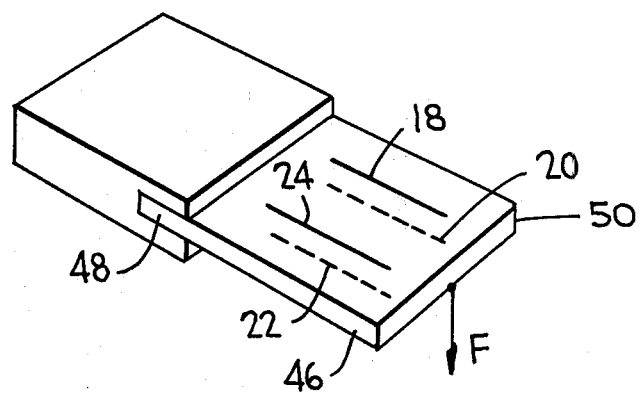
FIG. 2 is a perspective view of a beam deflection strain mounting for the fluid pressure strain measuring system of the present invention.

Referring now to FIG. 2 the fluid pressure measuring system of the present invention is illustrated in a typical strain measuring installation upon a beam 46 having a solidly fixed end 48 and deflected downwardly by a force F applied at a second end 50. Two of the strain deformable tubes 18 and 24 are mounted on the top of the beam 46 and the other two tubes 20 and 22 are mounted on the bottom of beam 46. It is a well-known principle of structural engineering that the force F applied downwardly at the end 50 of beam 46 will cause the beam to deflect downwardly so that the upper surface on which tubes 18 and 24 are mounted will be placed under tension and the outer layers of the member will elongate. Conversely, the lower surface of the beam 46 on which tubes 20 and 22 are mounted will be placed in compression and will, accordingly, tend to contract. The strains experienced by the top and bottom surfaces of beam 46 will cause the tubes mounted on the respective surfaces to strain or deform and thereby change in diameter. Such a diameter change will cause a change in fluid flow and also pressure which will be detected by transducer 40 and indicated by meter 44 as a measure of the strain experienced by the beam 46.

Many modifications and variations of the present invention are possible in light of the above teachings. It is therefore to be understood that within the scope of the appended claims the invention may be practiced otherwise than as specifically described.

What is claimed is:

1. A system for measuring strain in a body subjected to stress comprising:

a plurality of strain-deformable members adapted for attachment to said body and arranged in a fluid bridge configuration having a pair of fluid input junctions and a pair of fluid output junctions;

a source of fluid pressure connected across said fluid input junctions for supplying a fluid stream at a constant rate and pressure through said members in said fluid bridge; and a pressure sensitive transducer connected across said fluid output junctions, whereby a change in fluid flow rate and pressure in said members effected by deformations produced by strains in the body will be detected by said transducer.

2. The strain measuring system claimed in claim 1 wherein said plurality of strain deformable members comprises four tubes of equal diameter arranged in a four-arm Wheatstone bridge configuration.

3. The strain measuring system claimed in claim 1 further comprising indicating means connected to receive any output from said transducer.

4. The strain measuring system claimed in claim 1 wherein said fluid is air and said source of fluid pressure supplies an air stream at a constant rate and pressure.

5. The strain measuring system as claimed in claim 1 wherein said fluid is gas and said source of fluid pressure supplies a gas stream at a constant rate and pressure.

6. The strain measuring system claimed in claim 1 wherein said fluid is a liquid and said source of fluid pressure supplies a liquid stream at a constant rate and pressure.

* * * * *